(12) United States Patent
Berdouz Qrichi Aniba

(10) Patent No.: US 12,556,569 B2
(45) Date of Patent: Feb. 17, 2026

(54) METHOD AND SYSTEM FOR AUTOMATED FRAUD RISK DETECTION IN A MONITORED SYSTEM

(71) Applicant: Commissariat à l'énergie atomique et aux énergies alternatives, Paris (FR)

(72) Inventor: Hakima Berdouz Qrichi Aniba, Paris (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 275 days.

(21) Appl. No.: 18/259,335

(22) PCT Filed: Dec. 28, 2021

(86) PCT No.: PCT/EP2021/087710
§ 371 (c)(1),
(2) Date: Jun. 26, 2023

(87) PCT Pub. No.: WO2022/144347
PCT Pub. Date: Jul. 7, 2022

(65) Prior Publication Data
US 2024/0056471 A1 Feb. 15, 2024

(30) Foreign Application Priority Data

Dec. 28, 2020 (FR) .................... 20 14184

(51) Int. Cl.
*H04L 9/40* (2022.01)
(52) U.S. Cl.
CPC ...... *H04L 63/1433* (2013.01); *H04L 63/1425* (2013.01)
(58) Field of Classification Search
CPC . H04L 63/1433; H04L 63/1425; G06N 3/045; G06N 3/08; G06Q 20/4016
See application file for complete search history.

(56) References Cited

U.S. PATENT DOCUMENTS 10,009,358 B1 6/2018 Xie et al.
2016/0196615 A1* 7/2016 Yen .................... G06Q 20/4016
705/30

(Continued)

FOREIGN PATENT DOCUMENTS

CN 111047428 A * 4/2020 ............. G06Q 40/02
CN 111552680 A 8/2020

(Continued)

OTHER PUBLICATIONS

International Search Report issued Feb. 16, 2022 in PCT/EP2021/087710 filed on Dec. 28, 2021 2 pages.

(Continued)

*Primary Examiner* — Sarah Su
(74) *Attorney, Agent, or Firm* — Oblon, McClelland, Maier & Neustadt, L.L.P.

(57) ABSTRACT

The invention relates to a method and a system for the automated detection of the risk of fraud in a monitored system, based on data streams generated by said monitored system and characterizing events performed or generated by operators in said monitored system. The method includes: a pre-processing (30-38) of at least one set of data recorded over a period of time, so as to obtain a subset of critical events associated with an operator; the iterative application of a first parameterized estimation process (52,56) for a risk of fraud, so as to obtain a first legitimacy score and a first associated probability of occurrence; the iterative application of a second parameterized estimation process (54,58) for a risk of fraud, so as to obtain a second legitimacy score and a second associated probability of occurrence, and the comparison (60) of the results of said first and second processes, for determining (64) whether said operator is a legitimate operator or a fraudulent operator.

18 Claims, 4 Drawing Sheets

(56) References Cited

U.S. PATENT DOCUMENTS

2019/0311367 A1* 10/2019 Reddy ................. G06Q 20/4016
2024/0152926 A1*  5/2024 Musunuru ............. G06Q 40/02
2025/0029101 A1*  1/2025 Williams ........... G06Q 20/4014
2025/0148469 A1*  5/2025 Wirthlin ............. G06Q 20/4016

FOREIGN PATENT DOCUMENTS

| EP | 3 553 713 A1 | 10/2019 | | |
| WO | WO-2012075323 A1 * | 6/2012 | ............. | H04L 67/34 |
| WO | WO-2016011363 A1 * | 1/2016 | ............. | H04L 63/20 |
| WO | WO-2023128865 A2 * | 7/2023 | | |

OTHER PUBLICATIONS

French Search Report issued Sep. 6, 2021 in French Application 20 14184 filed on Dec. 28, 2020 3 pages (with English Translation of Categories of Cited Documents).

* cited by examiner

METHOD AND SYSTEM FOR AUTOMATED FRAUD RISK DETECTION IN A MONITORED SYSTEM

FIELD OF THE INVENTION

The present invention relates to a method and system for the automated detection of the risk of fraud in a monitored system, based on signals characterizing the monitored system.

BACKGROUND OF THE INVENTION

The invention belongs to the field of automated fraud prediction and detection, and finds various applications in systems wherein frauds can occur, for example financial systems, systems for managing and checking compliance and performance, banking systems, insurance systems, industrial systems.

More generally, we are interested in critical systems needing to be monitored, characterized by heterogeneous, structured (e.g. execution logs, formatted files) or unstructured (e.g. images, audio recordings) data streams that characterize events (e.g. operations, actions, transactions, executions, data delivery). Events are assigned to operators and are performed or generated/controlled by operators of the monitored system. The data characterizing the monitored system are recorded in time.

A constant and recurrent problem, whether concerning financial systems, banking systems, industrial systems, and information systems, is to automatically detect, at an early stage, any irregularity, anomaly or inconsistency which could be the result of a fraudulent use of the system or of errors in the use of the system or of compromises or even intrusions which could affect the system. Herein, fraud refers to an operation carried out by intentionally violating one or a plurality of rules and defense barriers defining the legitimate operation of a system or one or a plurality of the attributes thereof, an attribute referring to a founding feature of the system. In a case of suspected fraudulent operation or transaction, the operator who ordered such an operation/transaction is presumed to be a fraudster and is suspected of being at the origin of the fraud. A distinction can be made between external fraud, emanating from external operators who pretend to be legitimate operators (e.g., by obfuscation of a legitimate operator profile), and internal fraud, emanating from operators a priori legitimate, but potentially having malicious, compromising behavior or potentially being accomplice with external operators.

Various methods of fraud detection, in particular financial fraud detection, are known in the prior the art, which are based on artificial intelligence and machine learning techniques, based on supervised learning on databases relating to financial transactions. Known methods generally provide a rating component, characterizing the risk or the probability of fraud. As with any probabilistic estimation method, there is a risk (probability) of error in decision-making, expressed in terms of false positive rates and false negative rates. The false positive rate is the percentage of cases where the method applied detects fraud, whilst in fact it is a proven legitimate operator. In a dual way, the false negative rate is the percentage of cases where the applied method detects a legitimate operator, whilst in fact it is a proven fraudster. Such probabilities of error in decisions are calculated by applying the detection method to data relating to cases of fraud or of proven legitimate events/operations.

However, it has been found that most prior art fraud detection methods provide too high false-positive rates, which have a negative impact on the system in terms of performance and customer experience and do not guarantee that all false-negatives have been detected.

One of the goals of the invention is to remedy such drawback by proposing a more reliable method.

SUMMARY OF THE INVENTION

To this end, the invention proposes, according to one aspect, a method of automated detection of the risk of fraud in a monitored system, from data streams generated by said monitored system and characterizing events, performed or generated by operators in said monitored system. The method includes the following steps implemented by a computation processor:

A) pre-processing of at least one set of data recorded over a period of time, so as to obtain a subset of critical events associated with an operator, B) iterative application of a first parameterized process of estimating the risk of fraud, the parameters of said first parameterized process being obtained by learning on a first database representative of events performed or generated by legitimate operators, on at least part of said subset of critical events, for obtaining a first legitimacy score and a first associated probability of occurrence;

C) iterative application of a second parameterized process of estimating the risk of fraud, the parameters of said second process being obtained by learning on a second database representative of events performed or generated by fraudulent operators, on at least part of said subset of critical events, for obtaining a second legitimacy score and a second associated probability of occurrence, (D) comparison of the results of said first process and said second process, for determining whether said operator is a legitimate operator or a fraudulent operator.

Advantageously, the method of automated detection of the risk of fraud in a monitored system according to the invention independently implements a first process of calculating legitimacy, concomitant with a second process of calculating illegitimacy. Advantageously, the first process and the second process are robust computing methods deployed substantially in parallel.

The method of automated detection of the risk of fraud in monitored system according to the invention can further have one or a plurality of the features below, taken independently or according to all technically feasible combinations.

The pre-processing includes a determination of events from said recorded data, a computation of a signature of each event of at least a part of said events, said signature being representative of the risk of malfunction of the monitored system following said event.

The pre-processing further includes a determination of a subset of critical events the signature of which is greater than a predetermined risk threshold.

The method includes successive iterations of the application steps of said first and second processes, the first process being applied to distinct parts of said subset of critical events until validation of a first convergence criterion, the second process being applied to distinct parts of said subset of critical events until validation of a second convergence criterion.

Following the implementation of steps A) to C) on a set of data recorded over a period of time called first period of time, step D) implements a third convergence criterion, and in case of lack of convergence according to the third convergence criterion, the method includes an iteration of steps A) to D) on another set of data recorded over a second period of time, situated in the past with respect to said first period of time.

The computation of the signature of each event is performed according to past events, by a logistical regression method.

The parameters of said first parameterized process are obtained by supervised learning.

The parameters of said second parameterized process are obtained by unsupervised learning.

The method includes a preliminary step of classification of said events into a plurality of classes, and the application of steps A) to D) for at least one class of events.

According to another aspect, the invention relates to a system for the automated detection of the risk of fraud in a monitored system, from data streams generated by said monitored system and characterizing events performed or generated by operators in said monitored system. The system includes at least one computation processor configured for implementing:
- A) a module for pre-processing at least one set of data recorded over a period of time, so as to obtain a subset of critical events associated with an operator,
- B) a module for iterative application of a first parameterized process of estimating the risk of fraud, the parameters of said first parameterized process being obtained by learning on a first database representative of events performed or generated by legitimate operators, on at least part of said subset of critical events, for obtaining a first legitimacy score and a first associated probability of occurrence;
- C) a module for iterative application of a second parameterized process of estimating the risk of fraud, the parameters of said second process being obtained by learning on a second database representative of events performed or generated by fraudulent operators, on at least part of said subset of critical events, for obtaining a second legitimacy score and a second associated probability of occurrence,
- D) a module for comparing the results of said first process and second process, for determining whether said operator is a legitimate operator or a fraudulent operator.

According to another aspect, the invention relates to one or a plurality of computer programs including software instructions which, when implemented by a programmable electronic device, implement a method of automated detection of the risk of fraud in a monitored system, such as briefly described hereinabove.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION OF EMBODIMENTS

The invention finds applications for the automated detection of the risk of fraud in any system to be monitored, and more particularly in the case where the system to be monitored is a management system for checking compliance and performance in the industrial field.

Figure 1:
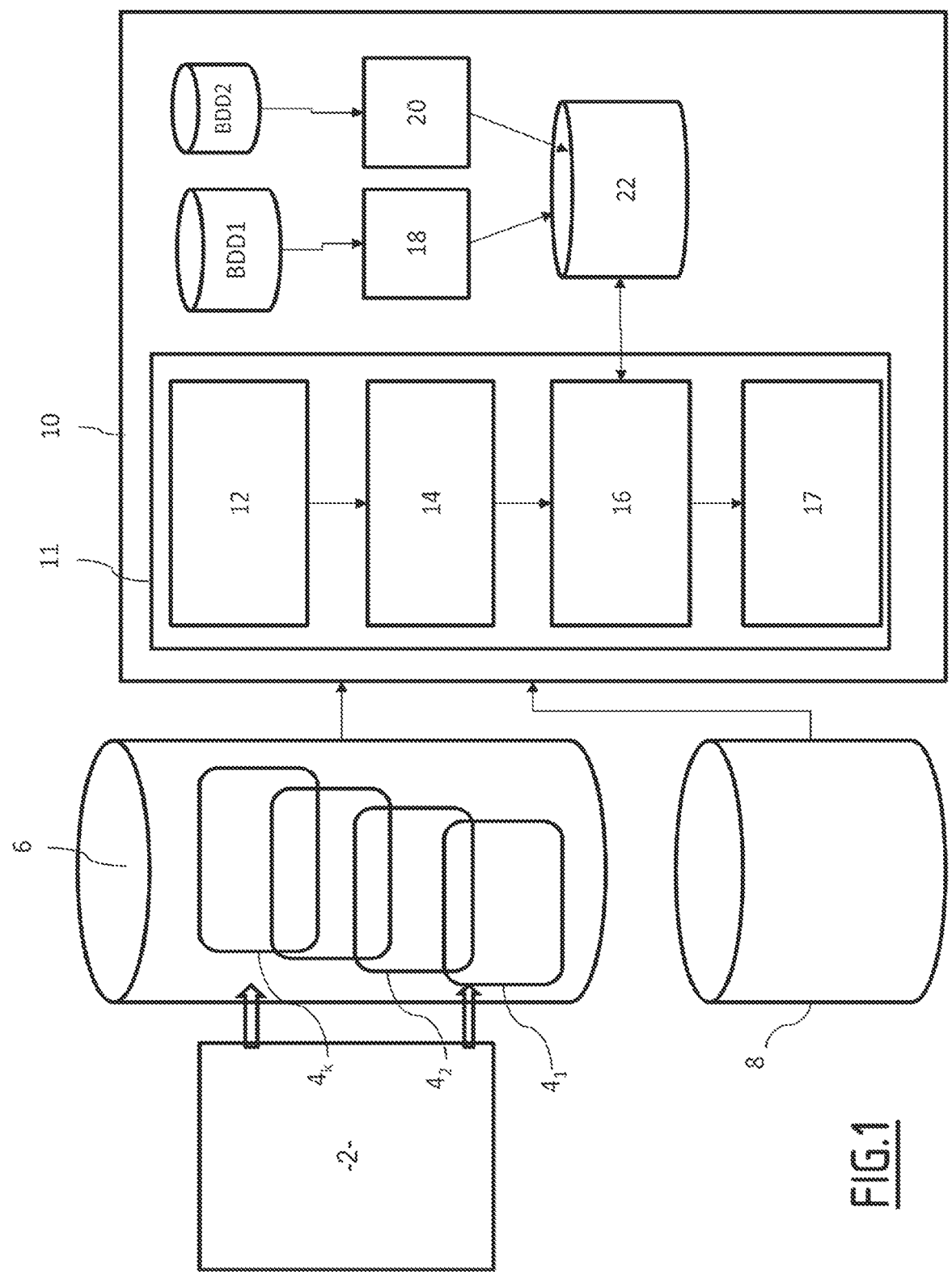
FIG. 1 shows a example of system of fraud detection according to one embodiment.

FIG. 1 schematically illustrates a system for automated detection of frauds according to one embodiment in a monitored system 2.

The monitored system generates data streams $4_1$ to $4_k$, which are recorded in one or a plurality of electronic memory units 6, for example in the form of a database or any other data storage structure. For example, the unit 6 consists of a plurality of interconnected memories.

Each data stream $4_i$, corresponds to a period of time $T_i$, the periods of time $T_1$ to $T_k$ following one after the other in time. For example each period of time $T_i$ has the same predetermined duration, e.g. between one month and one year, e.g. equal to six months. The periods of time follow one after another, e.g. in a given chronological order, e.g. the period $T_{i+1}$ being earlier than the period $T_i$, and so on.

Preferentially, the data streams $4_i$, are stored as same are being generated by the monitored system 2.

Each data stream comprises either structured or unstructured data and characterizes events performed or generated by the monitored system 2.

When recorded by the monitored system, the data, either structured or unstructured, are preferentially categorized and labeled according to the specificities of the monitored system.

Structured data include e.g. execution logs, formatted files, alarm transferred by monitoring mechanisms, and unstructured data include e.g. images/videos, audio recordings.

The recorded data characterize events (e.g. operations, actions, transactions, executions, data supply).

Events are assigned to operators and are performed or generated/controlled by operators of the monitored system.

Information relating to the operators is also recorded, in association with the data streams $4_i$.

For example, in one embodiment, each operator, denoted by Op, is identified by a chosen identifier Id_Op, and optionally, each operator also has an associated profile Profile_Op, which is also stored by the monitored system 2.

An operator profile includes characteristic attributes of the operator, such as age, gender, place of birth, whether or not being in a professional activity, etc.

The data streams $4_i$, stored over associated periods of time $T_l$ are accessible to an automated fraud detection system 10 according to the invention.

In one embodiment, the system 10 is suitable for further receiving contextual information 9 from an external database 8, the contextual information 9 comprising e.g. statistical knowledge on profiles of presumed fraudsters.

The system 10 uses the stored data streams $4_i$ and optionally the contextual information 9 for determining events relating to feared situations or threats, hereinafter called critical events.

Herein, a critical event refers to any operation, action, transaction, execution or supply of data which, according to an analysis carried out, can pertain to a potential malfunction of the monitored system, i.e. an anomaly or inconsistency, or a risk of anomaly or inconsistency in the event of detection of precursor events, relating to the operating rules of the monitored system. Each event, and a fortiori each critical event, is assigned to an operator.

Following a detection of critical events, the invention can be used for detecting whether the operator or each operator associated with critical events is a legitimate operator or a fraudulent operator (or presumed fraudster).

In the case of a legitimate operator, the critical events detected corresponding to errors or to malfunctions of the monitored system, the detection carried out is then an opportunity to improve the monitored system and/or the way to manage or to perform operations, transactions etc. in said system.

In the case of a fraudulent operator (presumed fraudster), the invention can be used for taking measures for preventing the fraudulent operator from continuing to act, for taking corrective measures, for preventing the occurrence of a major risk or of a threat.

The system 10 for automated fraud detection comprises one or a plurality of computation units 11 (e.g. one or a plurality of computation processors), e.g. distributed over several computers or on a single computer, or a plurality of generally programmable electronic devices, configured to implement:

optionally, a module 12 for classifying the data of the data streams 4i into classes,
  a module 14 for pre-processing events, for determining a subset of critical data associated with an operator;
  a module 16 for applying, substantially in parallel, two parameterized processes of estimation of the risk of fraud which are, respectively:
    a first parameterized process for estimating the risk of fraud, the parameters of the first parameterized process being obtained by learning (module 18) on a first database BDD1 of data representative of events performed or generated by legitimate operators;
    a second parameterized process of estimating the risk of fraud, the parameters of the second process being obtained by learning (module 20) on a second database representative of events performed or generated by fraudulent operators;
  a module 17 for comparing the results of said first process and second process, for determining whether said operator is a legitimate operator or a fraudulent operator.

The first process and the second process are applied to data streams $4_i$ associated with periods Ti, until validation of a convergence criterion as explained in detail hereinafter.

The computation unit 11 suitable for communicating with a memory unit 22, used for storing data and parameters useful for the implementation of the modules 12, 14, 16 and 17.

In one embodiment, the modules 12, where appropriate, and the modules 14, 16, and 17 are embodied in the form of software code, and form a computer program, including software instructions which, when implemented by a programmable electronic device, implement a method of automated detection of the risk of fraud in a monitored system.

In a variant (not shown), the modules 12, 14, 16, 17 are each embodied in the form of a programmable logic component, such as an FPGA (Field Programmable Gate Array) or a GPGPU (General-purpose processing on graphics processing), or further in the form of a dedicated integrated circuit, such as an ASIC (Application Specific Integrated Circuit).

The computer program for the automated detection of the risk of fraud in a monitored system is further apt to be recorded on a computer-readable medium (not shown). The computer-readable medium is e.g. a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card.

In one embodiment, each of the learning modules 18, 20 is embodied in the form of software code, and forms a computer program implementing a learning phase for each of the first and second processes of estimating the risk of fraud.

Figure 2:
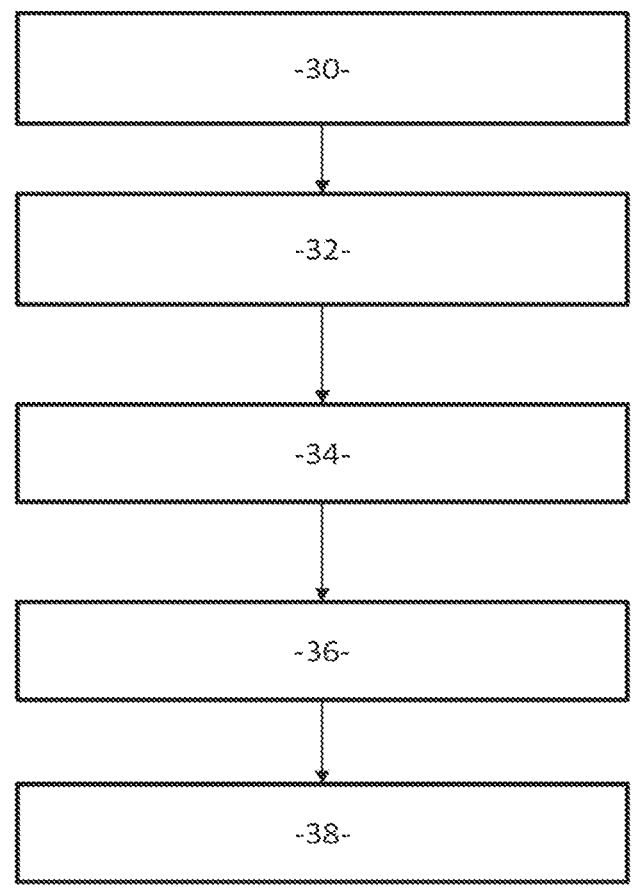
FIG. 2 is a synoptic diagram of the main steps of a pre-processing phase of a method of automated detection of the risk of fraud according to one embodiment.

FIG. 2 is a synoptic diagram of the main steps of a pre-processing phase of a method of detection of the risk of fraud according to one embodiment.

Such pre-processing phase comprises a step 30 of obtaining one or a plurality of data streams $4_1$ to $4_k$ generated by the monitored system.

For example, the data stream $4_i$ corresponding to a chosen period of time $T_i$ is obtained during the step 30.

The step 30 is followed by a step 32 of data analysis for determining events, e.g. operations, actions, transactions, executions, supply of data to the monitored system, incident alerts, and an optional step 34 of classification of events described hereinafter.

The step 32 or the step 34 is followed by a step 36 of computation of a signature representing a risk of malfunction of the monitored system for each event, then by a step 38 of determination and extraction of a subset of critical events.

In one embodiment, the steps 36 of computation of a signature representative of the risk of malfunction of the monitored system and 38 of determination of a subset of critical events, are performed by implementing a method of capturing and characterizing weak signals, as described in the patent FR 3 009 615 B1.

In a variant, a risk signature is calculated, for a considered event, by using a dependency between the considered event and past events on which the considered event depends, e.g. by using a tree representation of the dependencies between events.

For example, the following formulas are applied:

$$S = G^2 \times \theta \times M_R$$

Where:

$$M_R = \frac{1}{2}\left(1 + \sum_{i=1}^{3} \frac{4 - \mu_i}{\mu_i}\right)$$

And G, B, θ, $\mu_i \in \{1, 2, 3, 4\}$

In one embodiment, a risk signature is computed by a logistical regression algorithm.

A risk signature Ŝ is computed by the formula:

$$\hat{S} = \varphi(w^T \sigma + \delta)$$

Where φ(z) is an activation function having the formula:

$$\varphi(z) = \frac{1}{1 + e^{-z}},$$

w is a weighting vector.

For example a risk signature of an event is computed from risk signatures of N past events, each having a signature $\sigma_i$, $i \in \{1, \ldots, N\}$. The value $\delta$ brings in bias.

In one embodiment, following a computation, for each event, of a signature representative of the risk of malfunction of the monitored system, the signature is compared with a predetermined risk threshold, and the subset of critical events is determined as being the subset of events the signature of which is above said predetermined risk threshold.

At the end of the step 38, a subset of critical events is determined, each critical event being associated with an operator.

The next steps of the method of detection of the risk of fraud are performed for one or each of the operators associated with one or a plurality of critical event(s) of the subset of critical events.

In a variant, the pre-processing steps 32 to 38 are performed on events associated with only one and same operator.

Thereby, the application of the pre-processing described above makes it possible to determine one or a plurality of subsets of critical events, each subset of critical events being associated with an operator identified in the monitored system.

In a variant, the method further comprises an optional classification step 34, e.g. implemented either before or after the data analysis step 32, for determining events, e.g. operations, actions, transactions, executions, supply of data to the monitored system, incident alerts, classification of events in a plurality of classes of events.

For example, the principal component analysis (PCA) classification method can be used, for quantitative or for qualitative data, using a table of associations. For example, multiple correspondence factor analysis (MCA) is used.

Of course, other classification methods of the prior art are also applicable.

In said variant, all other steps are iteratively applied per class of events.

Figure 3:
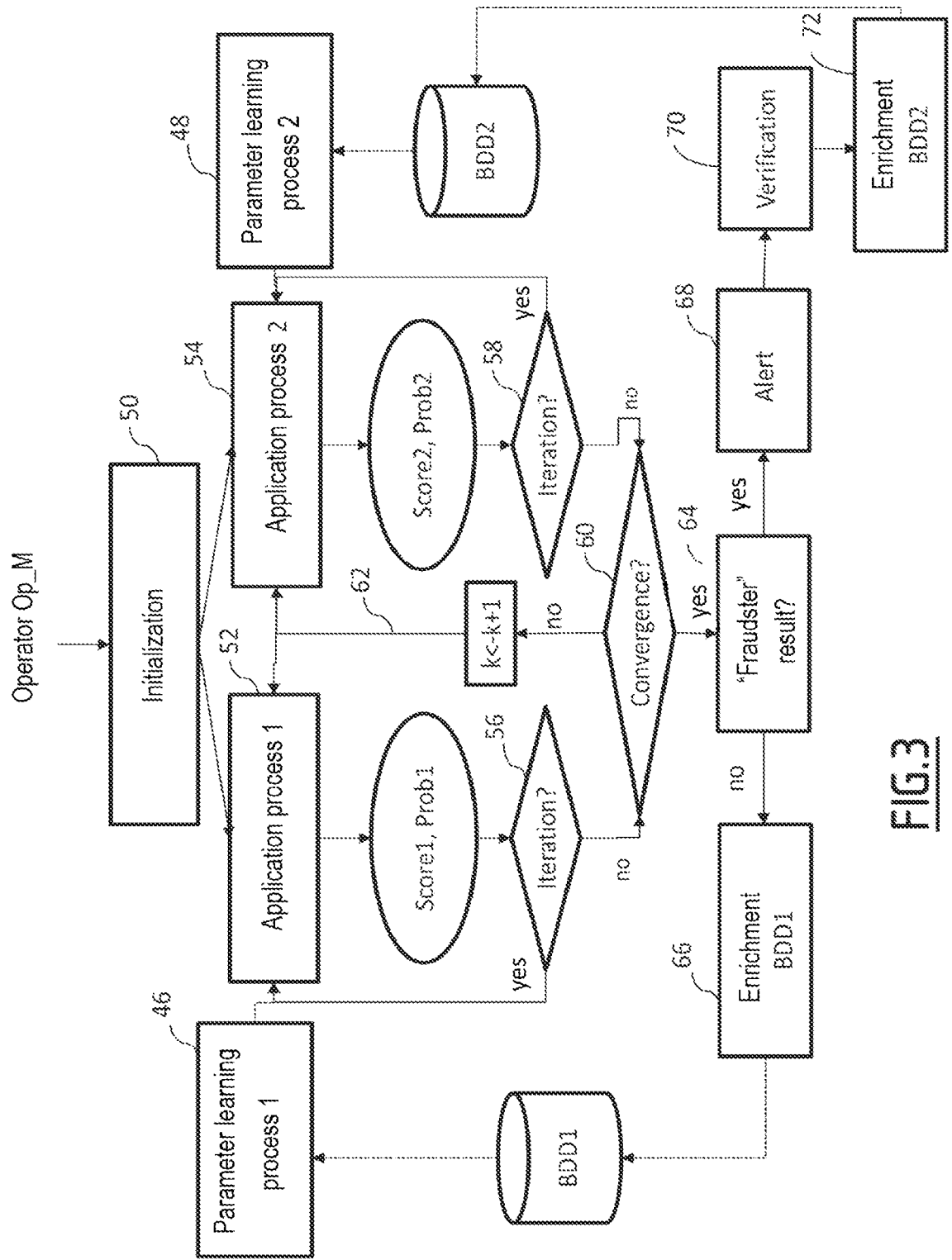
FIG. 3 is a synoptic flowchart of the main steps of processing by two separate processes for the automated detection of the risk of fraud.

FIG. 3 is a synoptic flowchart of the main steps of a processing by two distinct parameterized processes of estimation of the risk of fraud, the processing being performed substantially in parallel, for the same operator, and, where appropriate, for the same class of events.

The method comprises an initialization step 50, comprising a supply of data representative of critical events, associated with, and more precisely assigned to, the same operator Op_M with identifier Id_M, the data corresponding to at least a part of the subset of critical events determined at the end of the prior pre-processing phase. Data representative of critical events include e.g. measurements, evaluations, drifts, thresholds, etc.

The data representative of events are provided over one or a plurality of periods of time.

An index k indicates a period of time $T_k$ for which processing is applied, the periods of time being processed in a chosen order, e.g. an inverse chronological order, i.e. starting with a period of time close to a present instant and progressing in the inverse chronological order, i.e. moving away from the present instant to the past.

For example the index k is initialized to 1, $T_1$ referring to a last period of time before the present instant (i.e. the instant of application of the processing). Of course, the above is an option, and other options are possible.

The initialization step 50 is followed by substantially concomitant steps 52 and 54, which are a step 52 of application of a first parameterized process for the estimation of the risk of fraud, thereafter called "process 1", and a step 54, respectively, of application of a second parameterized process for the estimation of the risk of fraud, thereafter, called process 2.

The "process 1" and the "process 2" are applied to the same part of the data representing critical events associated with the operator identified by Id_M, of the period of time $T_k$.

In one embodiment, the "process 1" implements a machine learning algorithm, e.g. an artificial neural network comprising a plurality of layers, an input layer, at least one hidden layer, and an output layer, respectively. Preferentially, the learning 46 of the parameters of the "process 1", is a learning of the supervised type.

In one embodiment, the process 2 implements a machine learning algorithm, e.g. an artificial neural network comprising one or a plurality of layers. Preferentially, the learning 48 of the parameters of the "process 2" is a learning of the unsupervised type.

The two processes apply different neural networks, parameterized by training on different learning bases, BDD1 and BDD2, respectively, the first database BDD1 containing data representative of events performed or generated by legitimate operators; and the second database BDD2 containing data representative of events performed or generated by fraudulent operators.

Thereby, both processes are based on contradictory hypotheses.

Data $X_1$ to $X_N$ supplied at the input of such a neural network are represented in the form of a vector or a matrix. Such data are e.g. representative of previously determined critical events associated with the operator identified by Id_M.

Figure 4:
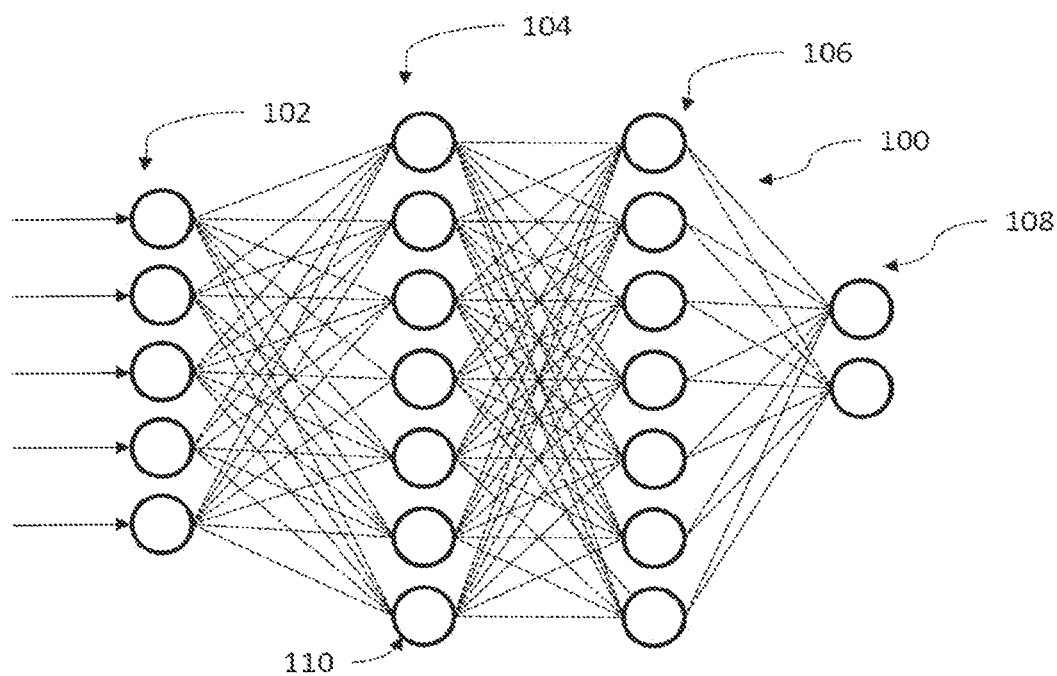
FIG. 4 schematically illustrates a neural network architecture.

FIG. 4 schematically illustrates a deep neural network with two hidden layers.

The neural network 100 shown in FIG. 4 includes an input layer 102, two hidden layers 104, 106 and an output layer 108.

Each layer Ci includes a number Ni of neurons 110. The numbers Ni vary from one layer to another.

In said example, each neuron of each layer is connected to each neuron of the preceding layer and to each neuron of the following layer, such a neural network being a fully connected network.

A neuron 110 computes a weighted sum of the inputs thereof, with an optional addition of bias b, then applies a function called activation function 6 on the computed weighted sum.

One can write:

$$Z = \Sigma w_i x_i + b$$

And $$Y = \sigma(Z)$$

Where $x_i$ are the inputs, $w_i$ are the respective weights, b is the bias, and $\sigma$ the activation function, Y is the output.

Thereby, each neuron performs a non-linear combination of the inputs.

The activation function $\sigma$ is e.g. the sigmoid function:

$$\sigma(z) = \frac{1}{1 + e^{-z}}$$

Of course, other activation functions are known, e.g. ReLu, for rectified linear unit, denoted by R(z):

$$R(z) = \max(0, z)$$

Other known activation functions, such as the hyperbolic tangent function or the Heaviside function, are also applicable.

The parameters defining a neural network, for one or a plurality of selected activation function(s) (e.g. the activation function can differ from one layer to another) are the weights $w_i$ and the bias values b for each neuron of each layer. Such parameters are computed in a training phase, on either supervised or unsupervised training data, for achieving a goal, i.e. for obtaining output values of the output layer 108 which satisfy a predetermined criterion, e.g. a cost function denoted by J(W,B), where W denotes the set of weights defining the neural network and B denotes the set of biases. The cost function J(W,B) is defined so as to minimize a probability of error in the sought for result.

Returning to FIG. 3, in one embodiment, the neural network applied by the "process 1" supplies at the output of the output layer, a first legitimacy score Score1 (M,X,k) characterizing the operator identified by Id_M, and a first probability of occurrence Prob1(M,X,k) associated with the critical events tested, over the period of time $T_k$.

The first legitimacy score is e.g. a real value between 0 and 1, corresponding to 0% legitimacy up to 100% legitimacy, respectively. In one embodiment, the value of the first legitimacy score indicates an estimation of distance between the identifier operator Id_M and a legitimate reference individual or an estimation of distance between the identifier operator Id_M and a reference fraudster individual.

A legitimate reference individual is either a statistical individual representing the statistical distribution of the population the individual represents, or one or a plurality of individuals the legitimacy of which has been proved concretely, or after a suspicion which was ultimately unproven, or according to an optimal time history justifying the qualification of the individual as a legitimate reference individual.

The cost function to be minimized for the neural network applied by the "process 1" is e.g. a function associated with the error of detection of a fraudulent operator.

For example, in one embodiment, the "process 1" implements a Convolutional Neural Network (CNN) including e.g. an input layer, an output layer and two hidden layers.

Similarly, in one embodiment, the neural network applied by the "process 2" provides at the output of the output layer, a second legitimacy score Score2(M,X,k) characterizing the operator Id_M and a second probability of occurrence Prob2(M,X,k) associated with the critical events tested, over the period of time $T_k$.

For example, in one embodiment, the "process 2" implements a Convolutional Neural Network (CNN). For the "process 2", simpler architectures are preferentially preferred, e.g. a neural network with a single layer, in order to gain in interpretability and explicability.

A first convergence criterion of the results of "process 1" is verified during the step 56, and if the first convergence criterion is not verified, the "process 1" is iterated on the data representative of other critical events of the subset of critical events of the period of time $T_k$.

Similarly, a second convergence criterion of the results of the "process 2" is verified during the step 58, and if this second convergence criterion is not verified, the "process 2" is iterated on the data representative of other critical events of the subset of critical events of the period of time $T_k$.

Then, when the first convergence criterion and the second convergence criterion are verified, the respective results of "process 1" and "process 2" are compared during a comparison step 60 implementing a third convergence criterion.

For example, a computed absolute difference between the first legitimacy score and the second legitimacy score is compared to a predetermined legitimacy score threshold.

If the third convergence criterion is not satisfied, the index k indicating the period of time processed is incremented (step 62), and steps 52, 56 and 54, 58 are iterated over a new period of time, preferentially a period of time of the past.

If the third convergence criterion is satisfied, the comparison step 60 is followed by a step 64 of verification of the final result. The verification of the third convergence criterion indicates that the first legitimacy score and the second legitimacy score are close to the same final legitimacy score. During the step 64, it is verified whether the final legitimacy score corresponds to a reference fraudster individual, i.e. indicates that the operator identified by Id_M is a presumed fraudster operator.

Otherwise, the operator identified by Id_M is presumed legitimate, the step 64 is followed by a step 66 of enrichment of the first training database BDD1.

Optionally, the step 66 is followed by the implementation of the step 46 of learning the parameters of the "process 1".

In the case where the operator identified by Id_M is presumed to be a fraudster, the step 64 is followed by a step 68 for raising an alert, e.g. by sending a notification, or any other means, to the managing authorities of the monitored system.

Preferentially, the alert is processed by applying a verification 70 by a human supervisor who either validates or invalidates the automated detection of fraud.

In the case of validation during the verification step 74, said step is followed by a step 72 of enrichment of the second database BDD2, and optionally, by an implementation of the step 48 of learning the parameters of the "process 2".

In the context of an investigation deployed after a suspicion of intentional irregularities in an industrial manufacturing or transformation method, which could be qualified as industrial fraud, the solution will delimit the scope of investigation associated with the method in question, by identifying all human players operating and/or interacting in the area concerned, and by listing and evaluating all the associated process organizational factors, and finally, the operational and industrial history of the industrial installation hosting the method.

In addition to targeting the detection of all the non-compliances associated with the processes and organizational modes with regard to the applicable regulatory or operational repository, each individual present or intervening on the method or even upstream or downstream of the method, is evaluated by means of the present solution.

If e.g. an individual has been present in the installation for a number of years, and is in conflict with his/her hierarchy and e.g. does not admit that his/her colleagues check or verify e.g. his/her computations or his/her task, then the system will lower the legitimacy score thereof and launch additional investigations to confirm or deny that the individual has intentionally committed fraud or data falsification, or, where appropriate, look for bodies of evidence, essential for helping the investigator in his/her decision-making.

The invention claimed is:

1. A method for the automated detection of the risk of fraud in a monitored system, from data streams generated by said monitored system and characterizing events, either performed or generated by operators in said monitored system, the method being implemented by a computation processor and comprising:

A) pre-processing of at least one set of data recorded over a period of time, so as to obtain a subset of critical events associated with an operator, B) iterative application of a first parameterized process of estimation of the risk of fraud, the parameters of said first parameterized process being obtained by learning on a first database representative of events performed or generated by legitimate operators, on at least part of said subset of critical events, for obtaining a first legitimacy score and a first associated probability of occurrence;

C) iterative application of a second parameterized process of estimation of the risk of fraud, the parameters of said second process being obtained by learning on a second database representative of events carried out or generated by fraudulent operators, on at least part of said subset of critical events, for obtaining a second legitimacy score and a second associated probability of occurrence, and (D) comparison of the results of said first process and said second process, for determining whether said operator is a legitimate operator or a fraudulent operator, the method further comprising successive iterations of the application of said first parameterized process and of said second parameterized process, the first parameterized process being applied to distinct parts of said subset of critical events until validation of a first convergence criterion, the second parameterized process being applied to distinct parts of said subset of critical events until validation of a second convergence criterion.

2. The method according to claim 1, wherein said pre-processing comprises a determination of events from said recorded data, a computation of a signature of each event of at least a portion of said events, said signature being representative of the risk of malfunction of the monitored system following said event.

3. The method according to claim 2, wherein said pre-processing further comprises a determination of a subset of critical events the signature of which is greater than a predetermined risk threshold.

4. The method according to claim 2, wherein the computation of a signature of each event is performed according to past events, by a logistical regression method.

5. The method according to claim 1, wherein, following the implementation of steps A) to C) on a set of data recorded over said period of time, called first period of time, step D) implements a third convergence criterion, and in case of lack of convergence according to the third convergence criterion, the method comprises an iteration of steps A) to D) on another set of data recorded over a second period of time, situated in the past with respect to said first period of time.

6. The method according to claim 1, wherein the parameters of said first parameterized process are obtained by a supervised learning (46).

7. The method according to claim 1, wherein the parameters of said second parameterized process are obtained by an unsupervised learning (48).

8. The method according to claim 1, further comprising a preliminary step of classification of said events into a plurality of classes, and the application of steps A) to D) for at least one class of events.

9. A computer program comprising software instructions which, when executed by a programmable electronic system, implement a method of automated detection of the risk of fraud in a monitored system according to claim 1.

10. The method according to claim 1, further comprising a preliminary step of classification of said events into a plurality of classes, and the application of steps A) to D) for at least one class of events.

11. A system for the automated detection of the risk of fraud in a monitored system, based on data streams generated by said monitored system and characterizing events, either performed or generated by operators in said monitored system, comprising at least one computation processor configured for implementing:

A) a module for pre-processing at least one set of data recorded over a period of time, so as to obtain a subset of critical events associated with an operator, B) a module for iterative application of a first parameterized process of estimating the risk of fraud, the parameters of said first parameterized process being obtained by learning on a first database representative of events performed or generated by legitimate operators, on at least part of said subset of critical events, for obtaining a first legitimacy score and a first associated probability of occurrence;

C) a module for iterative application of a second parameterized process for estimating the risk of fraud, the parameters of said second process being obtained by learning on a second database representative of events carried out or generated by fraudulent operators, on at least part of said subset of critical events, for obtaining a second legitimacy score and a second associated probability of occurrence, D) a module for comparing the results of said first process and second process, for determining whether said operator is a legitimate operator or a fraudulent operator, the system being configured to implement successive iterations of the module for the application of said first parameterized process and of the module for application of said second parameterized process, the first parameterized process being applied to distinct parts of said subset of critical events until validation of a first convergence criterion, the second parameterized process being applied to distinct parts of said subset of critical events until validation of a second convergence criterion.

12. A method for the automated detection of the risk of fraud in a monitored system, from data streams generated by said monitored system and characterizing events, either performed or generated by operators in said monitored system, the method being implemented by a computation processor and comprising:

A) pre-processing of at least one set of data recorded over a period of time, so as to obtain a subset of critical events associated with an operator, said pre-processing comprising a determination of events from said recorded data, a computation of a signature of each event of at least a portion of said events, said signature being representative of the risk of malfunction of the monitored system following said event, the computation of the signature of each event being performed according to past events, by a logistical regression method, B) iterative application of a first parameterized process of estimation of the risk of fraud, the parameters of said first parameterized process being obtained by learning on a first database representative of events performed or generated by legitimate operators, on at least part of said subset of critical events, for obtaining a first legitimacy score and a first associated probability of occurrence;

C) iterative application of a second parameterized process of estimation of the risk of fraud, the parameters of said second process being obtained by learning on a second database representative of events carried out or generated by fraudulent operators, on at least part of said subset of critical events, for obtaining a second legitimacy score and a second associated probability of occurrence, (D) comparison of the results of said first process and said second process, for determining whether said operator is a legitimate operator or a fraudulent operator.

13. The method according to claim 12, wherein said pre-processing further comprises a determination of a subset of critical events the signature of which is greater than a predetermined risk threshold.

14. The method according to claim 12, comprising successive iterations of the application of said first and second processes, the first process being applied to distinct parts of said subset of critical events until validation of a first convergence criterion, the second process being applied to distinct parts of said subset of critical events until validation of a second convergence criterion.

15. The method according to claim 12, wherein, following the implementation of steps A) to C) on a set of data recorded over said period of time, called first period of time, step D) implements a third convergence criterion, and in case of lack of convergence according to the third convergence criterion, the method comprises an iteration of steps A) to D) on another set of data recorded over a second period of time, situated in the past with respect to said first period of time.

16. The method according to claim 12, wherein the parameters of said first parameterized process are obtained by a supervised learning.

17. The method according to claim 12, wherein the parameters of said second parameterized process are obtained by an unsupervised learning.

18. A system for the automated detection of the risk of fraud in a monitored system, from data streams generated by said monitored system and characterizing events, either performed or generated by operators in said monitored system, the system comprising a at least one computation processor configured for implementing:

A) a module for pre-processing of at least one set of data recorded over a period of time, so as to obtain a subset of critical events associated with an operator, said pre-processing comprising a determination of events from said recorded data, a computation of a signature of each event of at least a portion of said events, said signature being representative of the risk of malfunction of the monitored system following said event, the computation of the signature of each event being performed according to past events, by a logistical regression method, B) a module for iterative application of a first parameterized process of estimation of the risk of fraud, the parameters of said first parameterized process being obtained by learning on a first database representative of events performed or generated by legitimate operators, on at least part of said subset of critical events, for obtaining a first legitimacy score and a first associated probability of occurrence;

C) a module for iterative application of a second parameterized process of estimation of the risk of fraud, the parameters of said second process being obtained by learning on a second database representative of events carried out or generated by fraudulent operators, on at least part of said subset of critical events, for obtaining a second legitimacy score and a second associated probability of occurrence, (D) a module for comparing the results of said first process and of said second process, for determining whether said operator is a legitimate operator or a fraudulent operator.

* * * * *